US009751252B2

(12) United States Patent
Kawaguchi et al.

(10) Patent No.: US 9,751,252 B2
(45) Date of Patent: Sep. 5, 2017

(54) MOLDING METHOD AND MOLDING DEVICE (71) Applicant: SCIVAX CORPORATION, Kanagawa (JP)

(72) Inventors: Hirosuke Kawaguchi, Tokyo (JP); Tatsuya Hagino, Kanagawa (JP); Satoru Tanaka, Tokyo (JP)

(73) Assignee: SCIVAX CORPORATION (JP)

( * ) Notice: Subject to any disclaimer, the term of this patent is extended or adjusted under 35 U.S.C. 154(b) by 440 days.

(21) Appl. No.: 14/371,849

(22) PCT Filed: Jan. 11, 2013

(86) PCT No.: PCT/JP2013/050464
§ 371 (c)(1),
(2) Date: Jul. 11, 2014

(87) PCT Pub. No.: WO2013/105658
PCT Pub. Date: Jul. 18, 2013

(65) Prior Publication Data
US 2015/0091220 A1    Apr. 2, 2015

(30) Foreign Application Priority Data

Jan. 11, 2012  (JP) .................................. 2012-003616
Jun. 11, 2012  (JP) .................................. 2012-131838

(51) Int. Cl.
*B29C 51/10*     (2006.01)
*B29L 31/00*     (2006.01)
(Continued)

(52) U.S. Cl.
CPC .............. *B29C 51/10* (2013.01); *B29C 51/06* (2013.01); *B29C 51/262* (2013.01);
(Continued)

(58) Field of Classification Search
None
See application file for complete search history.

(56) References Cited

U.S. PATENT DOCUMENTS

2003/0030188 A1*  2/2003  Spengler ............. B29C 37/0032
                                                        264/458
2006/0243372 A1   11/2006  Huber
(Continued)

FOREIGN PATENT DOCUMENTS

EP     0 972 627 A2    1/2000
EP     1 066 950 A1    1/2001
(Continued)

OTHER PUBLICATIONS

Translation of Written Opinion of PCT/JP2013/050464 mailed Apr. 16, 2013, four pages.
(Continued)

*Primary Examiner* — Monica Huson
(74) *Attorney, Agent, or Firm* — Factor Intellectual Property Law Group, Ltd.

(57) ABSTRACT

A shaping method and a shaping device are provided which can easily and inexpensively form a curved face in a film including a micropattern. A shaping method is for forming, in a predetermined shaping-target area of a film including a patterned face with a micropattern, and a rear face opposite to the patterned face, a curved face beyond the thickness of the film, and includes a fixing step for fixing an outer edge of the shaping-target area of the film by fixing means, a first heating step for heating the film 20 by heating means 95, and a pressure adjusting step for producing a predetermined pressure difference between both faces of the film by the pressurizing means in such a way that pressure at a side where the film is fixed in the fixing step becomes small to form a pre-curved face.

18 Claims, 6 Drawing Sheets

(51) Int. Cl.
　　　*B29K 101/12*　　　(2006.01)
　　　*B29K 105/00*　　　(2006.01)
　　　*B29C 51/06*　　　(2006.01)
　　　*B29C 51/26*　　　(2006.01)
　　　*B29C 51/42*　　　(2006.01)
　　　*B29C 51/46*　　　(2006.01)

(52) U.S. Cl.
　　　CPC ............ *B29C 51/421* (2013.01); *B29C 51/46* (2013.01); *B29K 2101/12* (2013.01); *B29K 2105/256* (2013.01); *B29L 2031/756* (2013.01); *B29L 2031/7739* (2013.01)

(56) References Cited

U.S. PATENT DOCUMENTS

2011/0163485 A1　7/2011　Yea
2013/0008591 A1　1/2013　Kondo

FOREIGN PATENT DOCUMENTS

| JP | 55-107415 | A | 8/1980 |
| JP | 58-185231 | A | 10/1983 |
| JP | S64-16629 | A | 1/1989 |
| JP | H06-114933 | A | 4/1994 |
| JP | 2010-186178 | A | 8/2010 |
| JP | 2011-136471 | A | 7/2011 |
| JP | 2011-527249 | A | 10/2011 |
| JP | 2011-251422 | A | 12/2011 |
| WO | 01/51270 | A1 | 7/2001 |
| WO | 2011/114484 | A1 | 9/2011 |

OTHER PUBLICATIONS

Extended European Search Report for related European Application No. 13736053.3 dated Aug. 28, 2015, 9 pages.

* cited by examiner

MOLDING METHOD AND MOLDING DEVICE

RELATED APPLICATIONS

This application is a national phase of International Patent Application No. PCT/JP2013/050464, filed Jan. 11, 2013, which claims the filing benefit of Japanese Patent Application No. 2012-003616, filed Jan. 11, 2012 and Japanese Patent Application No. 2012-131838, filed Jun. 11, 2012, the contents of all of which are incorporated herein by reference.

TECHNICAL FIELD

The present disclosure relates to a shaping method and a shaping device which form a curved face in a film with a micropattern.

BACKGROUND ART

Conventionally, a nano-imprinting technology is known which forms a micropattern in a micro-order or a nano-order. This is to depress a die with a micropattern against a shaping target like a resin, and to transfer the pattern to the shaping target by heat or light (see, for example, Patent Literature 1). In addition, in order to increase a transfer area, an imprinting device is proposed which pressurizes a flexible die or stage by fluid pressure (see, for example, Patent Literature 2).

CITATION LIST

Patent Literature

Patent Literature 1: WO 2004/062886
Patent Literature 2: JP 2009-154393

SUMMARY OF INVENTION

Technical Problem

Recently, it is expected to form a moth-eye structure on a curved face of a lens using the imprinting technology. In order to transfer a micropattern on the curved face, a curved die is necessary. However, preparation of an imprinting die to transfer a micropattern on a non-planar surface like a curved face is quite difficult and needs large costs.

The inventors of the present disclosure thought a method of depressing a film of resin die formed with a micropattern against a stage of lens curved face to form a curved face, but it was difficult to form a curved face when the curvature factor was large, and the formed pattern had an error.

Hence, it is an objective of the present disclosure to provide a shaping method and a shaping device which can easily and inexpensively form a curved face in a film with a micropattern.

Solution to Problem

To accomplish the above objective, a shaping method of the present disclosure is for forming, in a predetermined shaping-target area of a film comprising a patterned face including a micropattern, and a rear face opposite to the patterned face, a curved face beyond a thickness of the film, and the method includes: a fixing step for fixing an outer edge of the shaping-target area of the film; and a pressure adjusting step for producing a predetermined pressure difference between both faces of the resin film in such a way that a pressure of a fluid at a side where the resin film is fixed in the fixing step becomes relatively small.

In this case, depending on the material of the film it is preferable that the shaping method should further include a first heating step for heating the film. In addition, it is preferable that in the first heating step, a heated heat-transfer stage should be caused to contact the rear face of the film to heat the film.

Still further, in the pressure adjusting step, either one of the patterned face of the film and the rear face thereof may be maintained to an atmospheric pressure. Moreover, in the pressure adjusting step, the patterned-face side may be pressurized or depressurized.

Yet further, the shaping method further includes: a disposing step for disposing the film on a pressure receiving stage including a pressure receiving face that is a desired curved face in such a way that a rear face of a pre-curved face formed through the pressure adjusting step overlaps the pressure receiving face; and a pressurizing step for pressurizing the film against the pressure receiving stage from the patterned-face side by a fluid.

In this case, depending on the material of the film, it is preferable that the shaping method should further include a second heating step for heating the film. In addition, it is preferable that the shaping method should further include, prior to the pressurizing step, a depressurizing step for depressurizing an atmosphere between the film and the pressure receiving stage.

A shaping device according to the present disclosure forms, in a predetermined shaping-target area of a film comprising a patterned face including a micropattern, and a rear face opposite to the patterned face, a curved face beyond a thickness of the film, and the device includes: a first casing that forms a first pressure chamber at the patterned-face side of the film; a second casing that forms a second pressure chamber at the rear-face side of the film; fixing means for fixing an outer edge of the shaping-target area of the film; and pressure adjusting means for adjusting a pressure difference between the first pressure chamber and the second pressure chamber in such a way that pressure at a side where the fixing means fixes the film becomes small.

In this case, depending on the material of the film, it is preferable that the shaping device should further include heating means for heating the film. In addition, it is preferable that the heating means should include a heat-transfer stage which is formed so as to be separable from the rear face of the film, and which uniformly heats a contacting portion with the film.

The pressure adjusting means may maintain the first pressure chamber or the second pressure chamber to an atmospheric pressure. In addition, the pressure adjusting means may include pressurizing means for pressurizing the first pressure chamber or the second pressure chamber, or depressurizing means for depressurizing the first pressure chamber or the second pressure chamber.

The fixing means is formed integrally with the first casing or the second casing.

Advantageous Effects of Invention

According to the shaping device and shaping method of the present disclosure, it becomes possible to form a curved face in a film easily and inexpensively. In addition, when a pre-curved face is formed at first in the film, and a final curved face is formed thereafter, a curved face with a precise micropattern and a large curvature factor can be formed in the film.

It is to be understood that the aspects and objects of the present invention described above may be combinable and that other advantages and aspects of the present invention will become apparent upon reading the following description of the drawings and detailed description of the invention.

DESCRIPTION OF EMBODIMENTS

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

The shaping method of the present disclosure is to form, to a predetermined shaping-target area of a film 20 having a patterned face with a micropattern 20*a*, and a rear face opposite to the patterned face, a curved face beyond the thickness of the film 20, and mainly includes a fixing step for fixing the outer edge of the shaping-target area of the film 20, and a pressure adjusting step for causing a predetermined pressure difference between both faces of the resin film 20 in such a way that the pressure of the fluid at a side where the resin film 20 is fixed in the fixing step becomes relatively small (see FIGS. 1 to 9). Hence, a pre-curved face is formed on the film 20. Depending on the material of the film 20, the method may further include a first heating step for heating the film 20.

Figure 11:
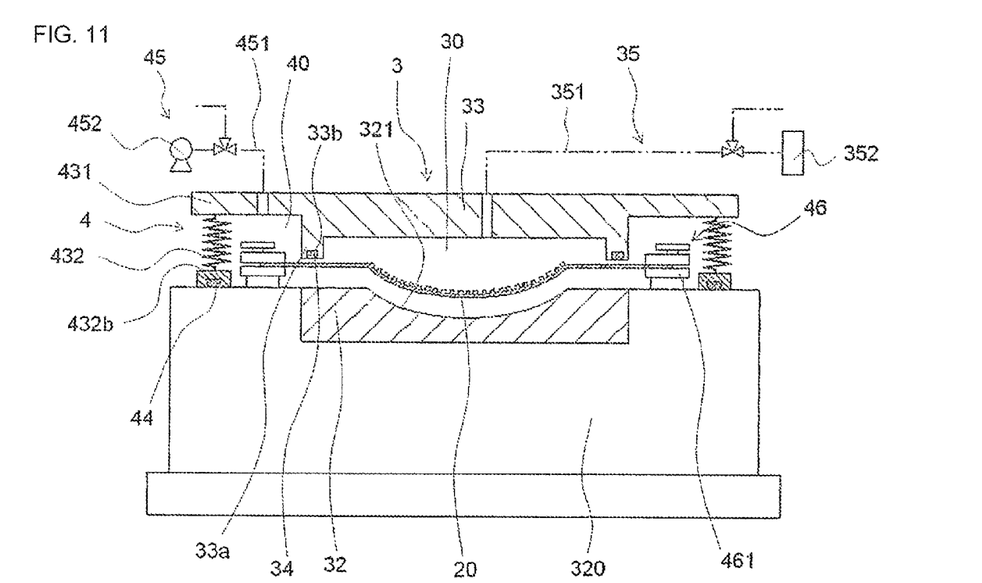
FIG. 11 is a partial end view illustrating a shaping device that forms a pre-curved face into a predetermined curved face.
Figure 12:
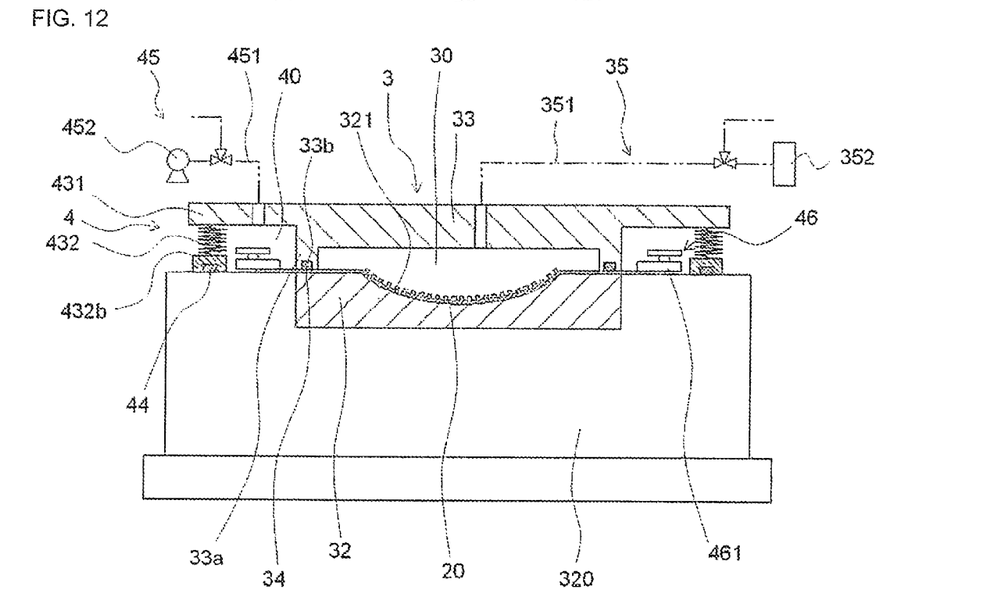
FIG. 12 is a partial end view illustrating a shaping device that forms a pre-curved face into a predetermined curved face.

Next, through a disposing step for disposing the film 20 on a pressure receiving stage 32 including a pressure receiving face that is a desired curved face in such a way that the rear face of the pre-curved face formed through the pressure adjusting step overlaps the pressure receiving stage 32, and a pressurizing step for depressing the film 20 against the pressure receiving stage 32 from the patterned-face side by a fluid, a final curved face is formed (see FIGS. 11 and 12).

In this case, also, depending on the material of the film 20, the method may further include a second heating step for heating the film 20.

In this case, the micropattern 20*a* is a geometrical shape formed by concavities and convexities with a smaller depth than the thickness of the film 20. For example, a concavo-convex structure functioning as a moth-eye corresponds to such a geometrical shape. The micropattern 20*a* has the minimum dimension of the width of the concavity and convexity in the planar direction formed in various sizes, such as equal to or smaller than 100 μm, equal to or smaller than 10 μm, equal to or smaller than 2 μm, equal to or smaller than 1 μm, equal to or smaller than 100 nm, or equal to or smaller than 10 nm. In addition, the dimension in the depthwise direction is also formed in various sizes, such as equal to or larger than 10 nm, equal to or larger than 100 nm, equal to or larger than 200 nm, equal to or larger than 500 nm, equal to or larger than 1 μm, equal to or larger than 10 μm, or equal to or larger than 100 μm.

Still further, the shaping-target area in the film 20 means an area where a curved face is formed at the time of shaping. An example curved face is a curved face for a lens, and a pre-curved face means a provisional curved face to form a final curved face.

The film 20 is not limited to any particular one as long as the shaping-target area can be deformed as a curved face at a predetermined temperature, but for example, a resin or a metal is applicable as such a film. Example resins are thermoplastic resins including a cyclic-olefin-based resin, such as a cyclic-olefin ring-open polymerized/hydrogen-added substance (COP) or a cyclic-olefin copolymer (COC), an acrylic resin, polycarbonate, a vinyl-ether resin, a fluorine resin, such as perfluoroalkoxyalkane (PFA) or polytetrafluoroethylene (PTFE), polystyrene, a polyimide-based resin, and polyester-based resin. Example metals are nickel, gold, and silver. When the film is used as an imprinting die, one with a flexibility that can deform by fluid pressure is preferable.

In the fixing step, the outer edge of the shaping-target area of the film 20 is fixed by fixing means 94 (see FIGS. 1, 4, and 7) in such a way that only the shaping-target area of the film 20 is deformed to the negative-pressure side in the pressure adjusting step.

In the first heating step, the film 20 is heated using heating means 95. It is appropriate if at least the shaping-target area is heated in this step. The heating temperature can be a temperature that can deform the film 20 to a curved face at the time of pressure adjusting step, and for example, in the case of a resin film, such a temperature should be equal to or higher than the glass transition temperature of the resin. As to heating, any technique is applicable as long as the film 20 can be heated, but if a heated heat-transfer stage 951 is caused to contact the whole rear face of the shaping-target area to heat it, the shaping-target area can be uniformly heated, and thus this technique is suitable. In this case, the heat-transfer stage 951 is retracted to a location that does not disturb the shaping prior to the pressure adjusting step (see FIGS. 2, 5 and 8). When the film 20 is a plastically deformable material like a metal, the first heating step can be omitted.

In the pressure adjusting step, the pressure of the fluid at a side where the film 20 is fixed in the fixing step becomes relatively smaller than the pressure at the other side, thereby producing a predetermined pressure difference between both faces of the film 20. This pressure difference becomes the shaping pressure. Hence, uniform pressure is applied to the shaping-target area of the film 20, and a convex pre-curved face is formed at the negative pressure side (see FIGS. 3, 6 and 9). Note that the fluid means a gas or a liquid.

Next, an explanation will be given of a step for shaping the pre-curved face formed in the film 20 to a desired curved face (see FIGS. 11 and 12).

In the disposing step, the film 20 is disposed in such a way that the rear face of the pre-curved face overlaps a pressure receiving face 321. That is, in order to prevent the micropattern 20a from being damaged during the shaping, the surface where no micropattern 20a is formed is set to face the pressure receiving face 321. In this case, it is preferable that the pressure receiving face 321 should be formed to a surface roughness that does not damage the micropattern 20a, e.g., a mirror-finished surface.

In the second heating step, the film 20 is heated. It is appropriate that at least the pre-curved face is heated in this step. The heating temperature can be a temperature that can deform the film 20 to a curved face at the time of pressurizing step, and for example, in the case of a resin film, such a temperature should be equal to or higher than the glass transition temperature of the resin. As to heating, any technique is applicable as long as the film 20 can be heated, but if the pressure receiving stage is heated, the film 20 can be uniformly heated, and thus this technique is suitable. When the film 20 is a metal, etc., the second heating step can be omitted.

In the pressurizing step, the film 20 is pressurized against the pressure receiving stage 32 from the patterned face side by fluid pressure. The pressurizing step may be performed before or after the second heating step, which can be determined depending on the hardness, etc., of the film 20.

Subsequently, a desired curved face is formed in the film 20 through, if necessary, a cooling step for cooling the temperature of the film 20 to a predetermined temperature, e.g., a temperature equal to or lower than the glass transition temperature of the resin in the case of a resin film.

In order to eliminate a gas present between the film 20 and the pressure receiving stage 32, and to uniformly depress the film 20 against the pressure receiving stage 32, it is preferable to have a depressurizing step for depressurizing the atmosphere between the film 20 and the pressure receiving stage 32 prior to the pressurizing step. In this case, when depressurized, it is preferable that after the film 20 and the pressure receiving stage 32 are spaced apart and the gas between the film 20 and the pressure receiving stage 32 is surely eliminated, the pre-curved face should be disposed so as to overlap the pressure receiving face 321. Needless to say, in order to suppress a deformation of the film 20 when depressurized, it is preferable to set the pressure at both surfaces of the film 20 to be equal.

In this way, a desired curved face can be easily and inexpensively formed in the film 20 having the micropattern 20a. In addition, the product can be utilized as an imprinting die to transfer a micropattern like a moth-eye to a lens curved face, etc., by imprinting.

Next, an explanation will be given of a shaping device to form a curved face corresponding to the pre-curved face of the shaping method of the present disclosure. The shaping device of the present disclosure is to form, in a predetermined shaping-target area of the film 20 having the patterned face with the micropattern 20a and a rear face opposite to the patterned face, a curved face beyond the thickness of the film 20. Such a shaping device mainly includes a first casing 91 forming a first pressure chamber 910 at the patterned face side of the film 20, a second casing 92 forming a second pressure chamber 920 at the rear face side of the film 20, the fixing means 94 for fixing the outer edge of the shaping-target area of the film 20, and a pressure adjusting means 93 for adjusting the pressure difference between the first pressure chamber 910 and the second pressure chamber 920 in such a way that the pressure by a fluid at a side where the fixing means 94 supports the film 20 becomes relatively small. The shaping device may further include the heating means 95 for heating the film 20 depending on the material thereof.

The heating means 95 is not limited to any particular one as long as it can heat the film 20, but the use of the heat-transfer stage 951 which contacts the rear face of the film 20 and which transfers heat from an electric heater is preferable. In this case, the heat-transfer stage 951 includes moving means 952, and is formed so as to be able to come close to or go apart from the film 20. An example moving means 952 includes, for example, an electric motor and a ball screw, and moves the heat-transfer stage 951 close to or apart from the film 20. The moving means is not limited to this structure as long as it can move the heat-transfer stage 951 close to or apart from the film 20, and a hydraulic or pneumatic cylinder can be applied. Hence, when heating, the heat-transfer stage 951 is caused to contact the rear face of the film 20 to uniformly heat the film 20 at a fast speed, and is retracted to a location which does not bother the shaping at the time of shaping. In addition, another example of the heating means is, although not illustrated, one heating a gas supplied to the first pressure chamber 910 or the second pressure chamber 920. When the material of the film 20 is a metal, etc., the heating means 95 can be omitted.

Figure 5:
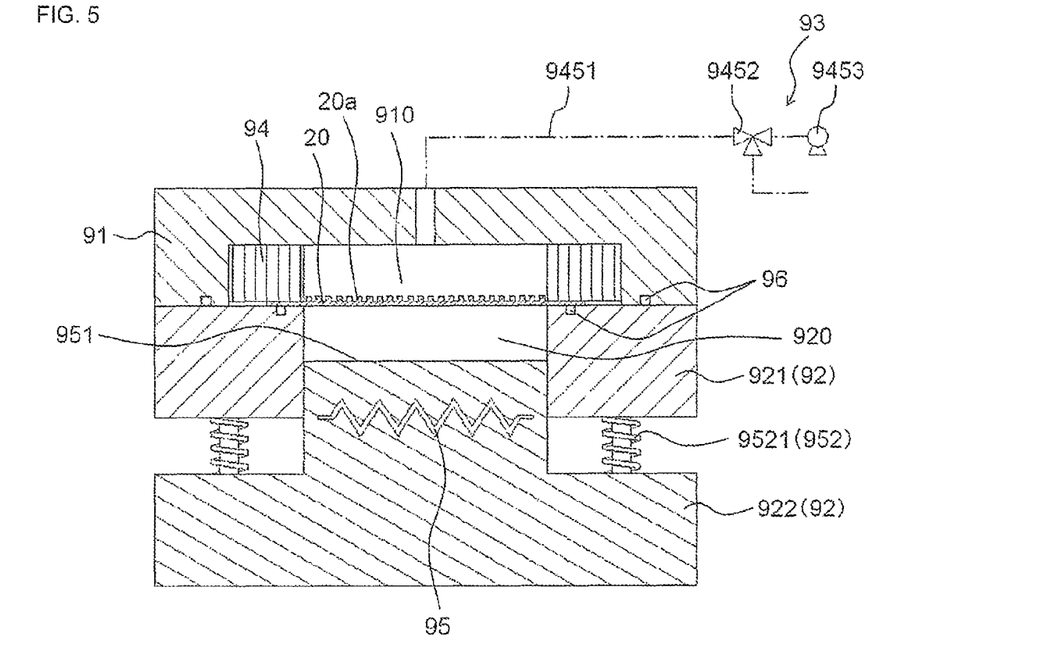
FIG. 5 is a partial end view illustrating another shaping device of the present disclosure.
Figure 6:
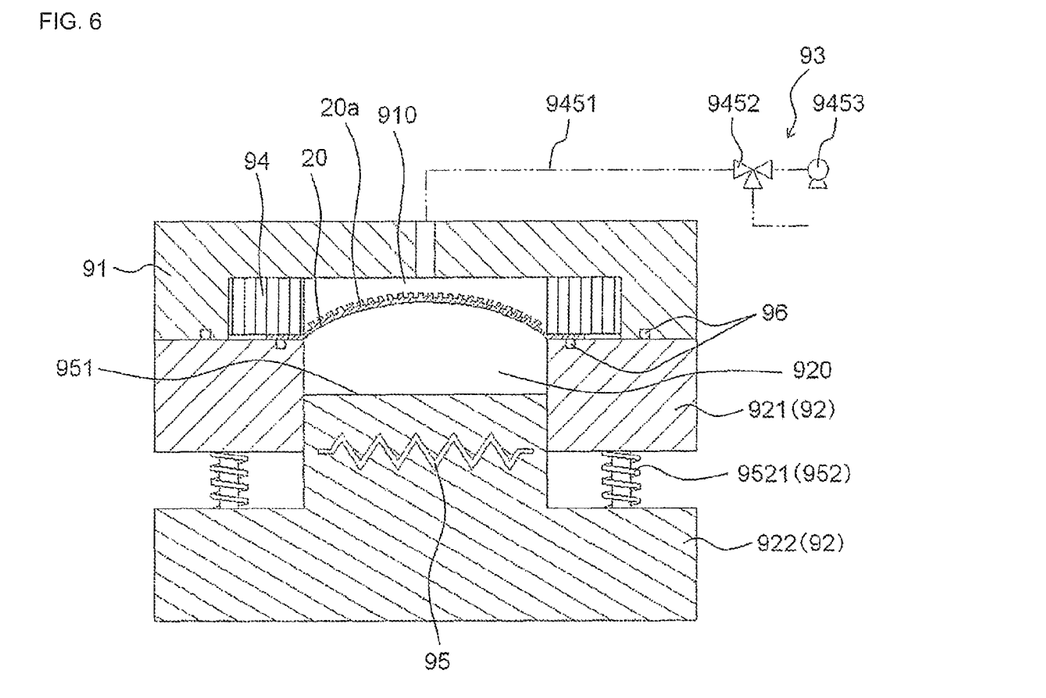
FIG. 6 is a partial end view illustrating another shaping device of the present disclosure.
Figure 7:
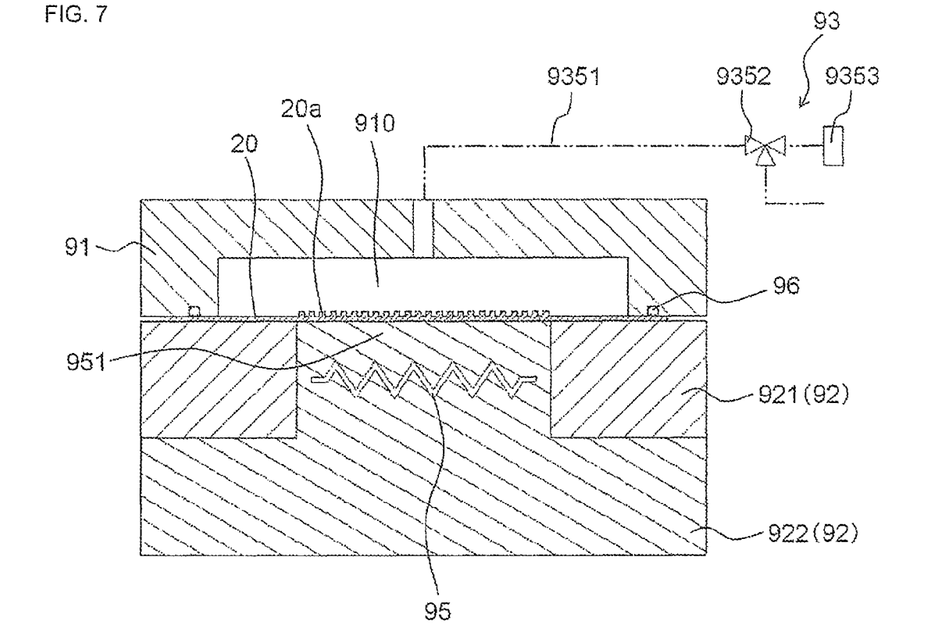
FIG. 7 is a partial end view illustrating the other shaping device of the present disclosure.
Figure 8:
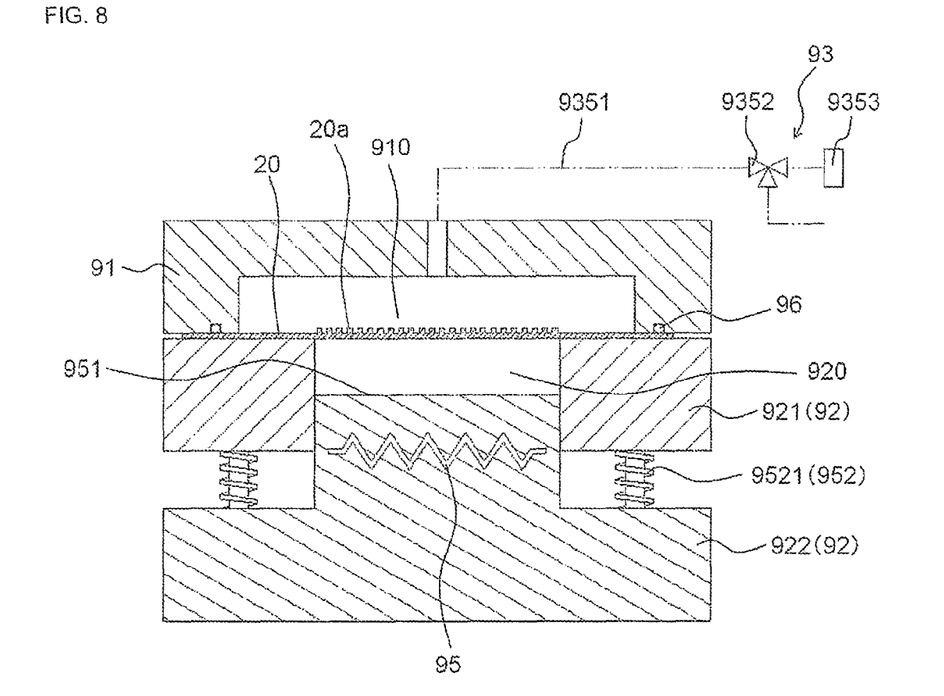
FIG. 8 is a partial end view illustrating the other shaping device of the present disclosure.
Figure 9:
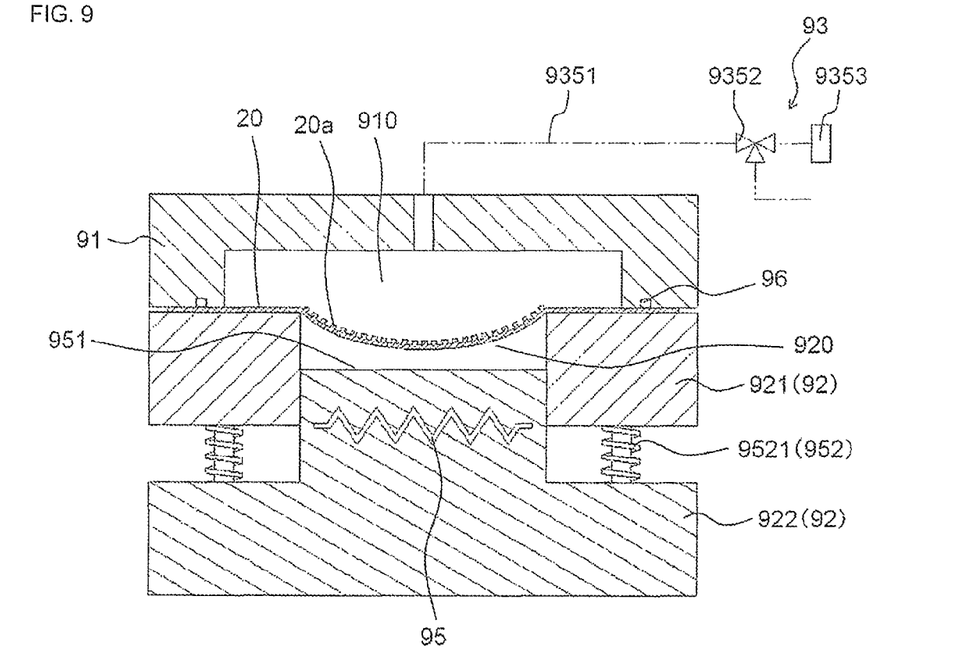
FIG. 9 is a partial end view illustrating the other shaping device of the present disclosure.
Figure 10:
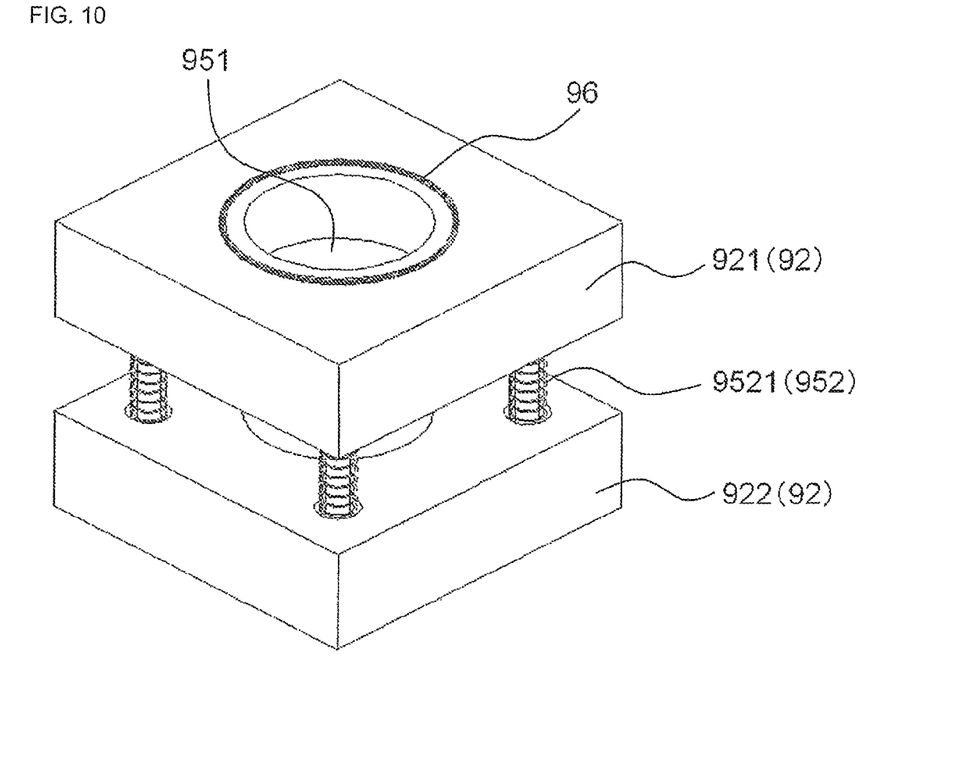
FIG. 10 is a schematic perspective view illustrating a second casing of a shaping device of the present disclosure.

The first casing 91 is not limited to any particular one as long as it can form the first pressure chamber 910 at the patterned face side of the film 20, and for example, is formed in, as illustrated in FIGS. 7 to 9, a cylindrical shape with an open end but with a bottom, and forms the first pressure chamber 910 when the open end is closed by the film 20. As illustrated in FIGS. 1 to 6, as long as the first pressure chamber 910 can be isolated from the second pressure chamber 920, the open end may be closed together with the fixing means and the second casing 92 in addition to the film 20.

Still further, the second casing 92 is not limited to any particular one as long as it can form the second pressure chamber 920 at the rear face side of the film 20, and for example, is formed in a cylindrical shape with an open end but with a bottom, and forms the second pressure chamber 920 when the open end is closed by the film 20. As long as the first pressure chamber 910 can be isolated from the second pressure chamber 920, the open end may be closed together with the fixing means and the first casing 91 in addition to the film 20 (see FIGS. 1 to 3).

The materials of the first casing 91 and second casing 92 are not limited to any particular ones as long as such casings have pressure resistance and heat resistance, and for example, a metal like stainless-steel is applicable.

The first casing 91 and the second casing 92 may have displacing means to release the first pressure chamber 910 and the second pressure chamber 920. The displacing means is not illustrated in the figure, but moves relatively so as to adjust a distance between the first casing 91 and the second casing 92. For example, the first casing 91 can be moved close to or moved apart from the second casing 92 by an electric motor and a ball screw. Needless to say, the displacing means is not limited to any particular one as long as it can move the first casing 91 close to or apart from the second casing 92, and for example, the first casing can be moved by a hydraulic or pneumatic cylinder.

Figure 1:
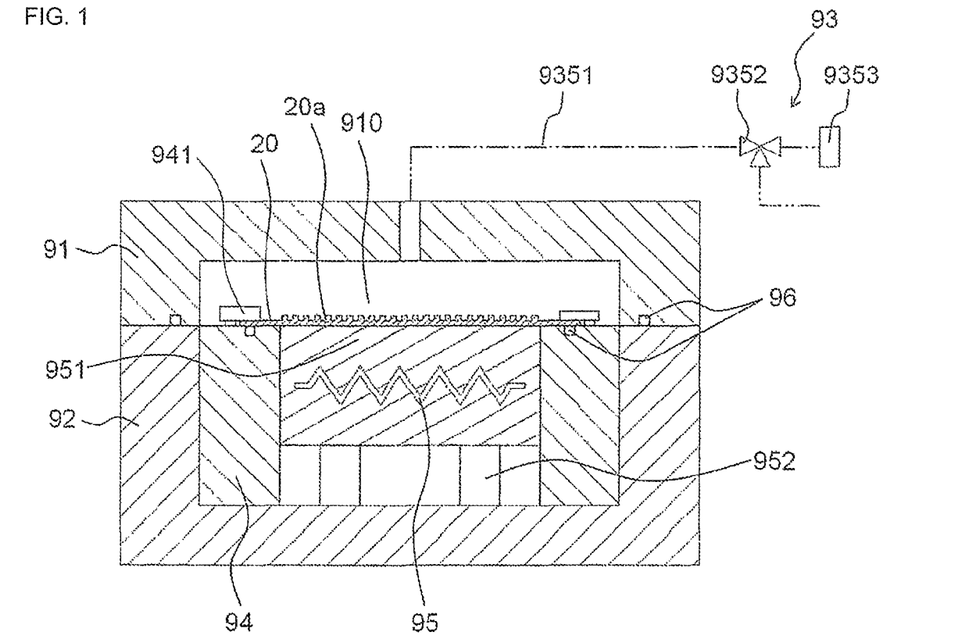
FIG. 1 is a partial end view illustrating a shaping device of the present disclosure.
Figure 2:
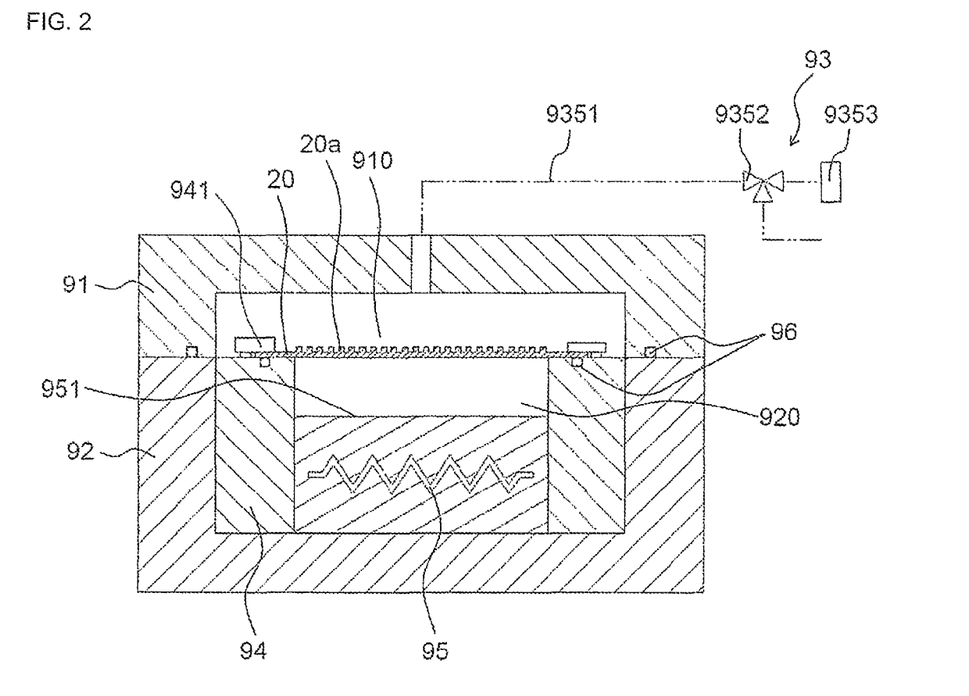
FIG. 2 is a partial end view illustrating the shaping device of the present disclosure.
Figure 3:
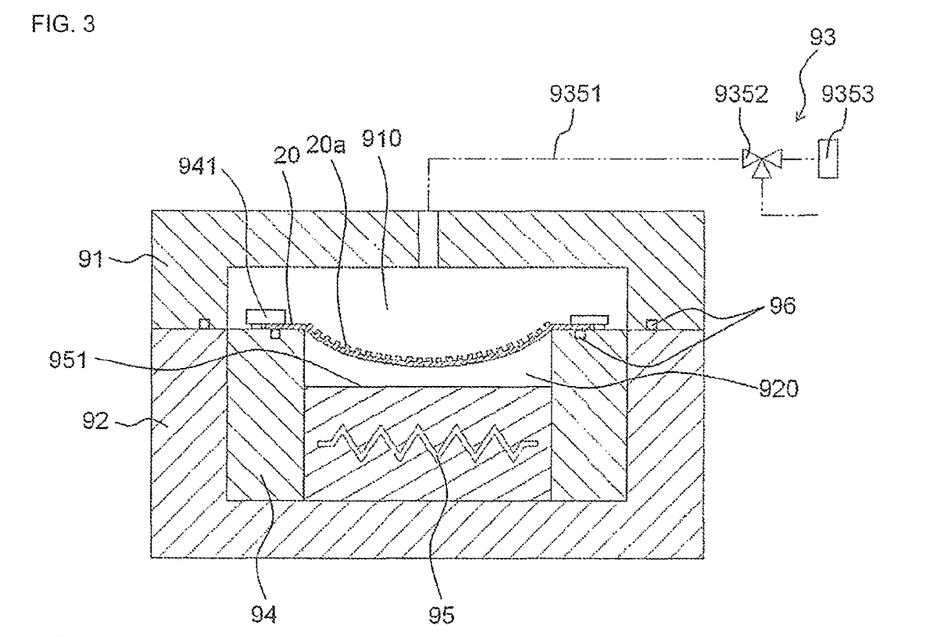
FIG. 3 is a partial end view illustrating the shaping device of the present disclosure.

In FIGS. 1 to 3, the explanation was given of an example case in which the heat-transfer stage 951 is built in the second casing 92, but as illustrated in FIGS. 4 to 9, the heat-transfer stage 951 may be formed integrally with the second casing 92. In this case, the second casing 92 includes a cylindrical second-case side wall 921 having both end opened, and a convexed second-case bottom 922 formed integrally with the heat-transfer stage 951 to be fitted in the opening of the second-case side wall. An elastic body like a spring 9521 that is a part of the moving means 952 may be disposed between the second-case side wall 921 and the second-case bottom 922. Accordingly, when the first casing 91 is moved close to or apart from the second-case side wall 921, the heat-transfer stage 951 can be moved into the opening of the second-case side wall 921, and thus the heat-transfer stage can contact the film 20 or can be moved apart therefrom.

The fixing means 94 is to fix the outer edge of the shaping-target area of the film 20 so as to let only the shaping-target area of the film 20 deformed at the time of shaping. For example, as illustrated in FIGS. 1 to 3, a cylindrical frame having a hole in the same shape as the shaping-target area is applicable. The film 20 can be pinched to the frame by pinching means 941 like a clip. The fixing means 94 may be formed integrally with the first casing 91 or the second casing 92 (see, for example, FIGS. 7 to 9). The frame is disposed in the pressure chamber at a side where the curved face to be formed is convexed. That is, when the first pressure chamber 910 becomes positive pressure relative to the second pressure chamber 920 at the time of shaping, the frame is disposed in the second pressure chamber 920, and when the second pressure chamber 920 becomes positive pressure relative to the first pressure chamber 910, the frame is disposed in the first pressure chamber 910.

The first casing 91, the second casing 92, or the frame (fixing means 94) may be provided with sealing means 96 to surly seal the first pressure chamber 910 and the second pressure chamber 920. For example, as illustrated in FIGS. 1 to 9, an O-ring as the sealing means 96 is provided, and a concaved recess shallower than the diameter of the cross-section of the O-ring is formed in the first casing 91, the second casing 92 or the frame, and the O-ring is disposed in the recess.

The pressure adjusting means 93 adjusts the pressure difference between the first pressure chamber 910 and the second pressure chamber 920, and applies predetermined pressure to the shaping-target area of the film 20 to form a curved face. The pressure is adjusted in such a way that the pressure of the fluid at the side where the fixing means 94 fixes the film 20 becomes relatively small. The pressure adjusting means 93 is not limited to any particular one as long as the pressure of the gas in the first pressure chamber 910 and second pressure chamber 920 can be adjusted, but for example, a structure which makes the pressure of either one of the first pressure chamber 910 and the second pressure chamber 920 to be constant, and which increases or decreases the other pressure by what corresponds to the necessary pressure for shaping.

An example pressure adjusting means 93 is pressuring means which maintains the second pressure chamber 920 to be an atmospheric pressure, and which causes the pressure in the first pressure chamber 910 to be positive pressure by predetermined shaping pressure using a pressure sensor (unillustrated). The pressuring means has, as illustrated in FIG. 1, the first casing 91 to be connected with a first-pressure-chamber gas charge/discharge flow channel 9351, and supplies gas, such as air or an inert gas to the first pressure chamber 910 through the first-pressure-chamber gas charge/discharge flow channel 9351 and a three-way valve 9352. To supply such a gas, a gas supply source 9353 like a tank or a compressor including compressed gas is applicable. In addition, the second pressure chamber 920 is formed with a communication channel or a gap, etc., in communication with the exterior so as to be maintained at an atmospheric pressure. To discharge the gas utilized for pressurizing can be discharged to the exterior by opening/closing the three-way valve 9352. A safety valve may be added as needed.

Figure 4:
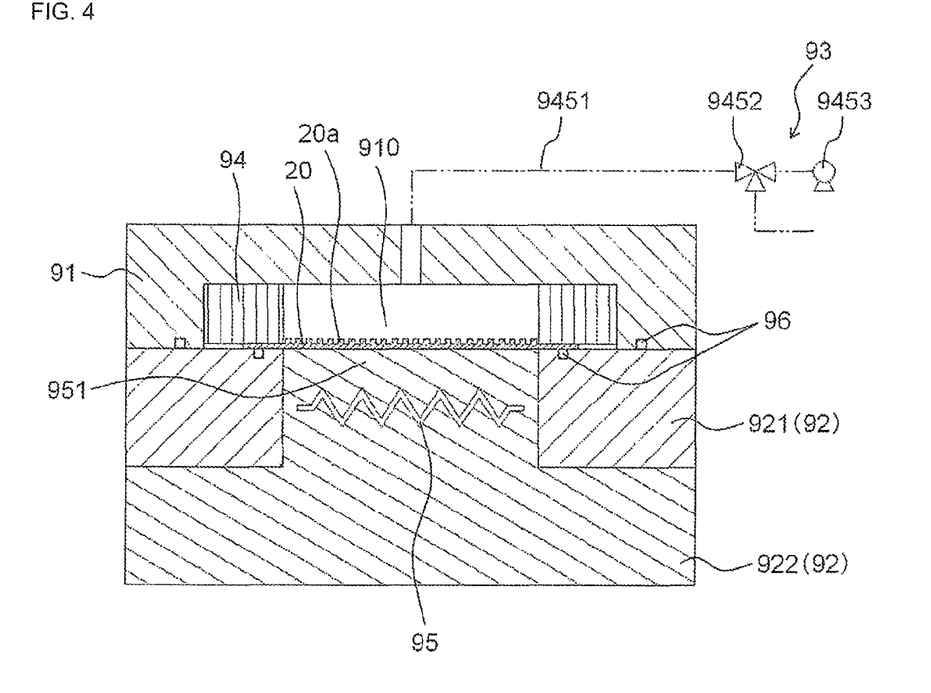
FIG. 4 is a partial end view illustrating another shaping device of the present disclosure.

Another example pressure adjusting means 93 is a depressurizing means which maintains the second pressure chamber 920 to be an atmospheric pressure, and which depressurizes the first pressure chamber 910 by a predetermined shaping pressure using a pressure sensor (unillustrated). The depressurizing means has, as illustrated in FIGS. 4 to 6, the first casing 91 connected with a depressurizing pump 9453 through a depressurizing-chamber gas charge/discharge flow channel 9451 and a three-way valve 9452, and discharges gas like air in the first pressure chamber 910. In addition, the second pressure chamber 920 is formed with a communication channel or a gap, etc., in communication with the exterior so as to be maintained at an atmospheric pressure. In order to recover the depressurized first pressure chamber 910, external gas is supplied to the first pressure chamber 910 by opening/closing the three-way valve 9452. In addition, a safety valve may be added as needed.

The pressure adjusting means 93 may have both pressuring means and depressurizing means.

In the above explanation, the explanation was given of a case in which the second pressure chamber 920 is maintained to an atmospheric pressure, and the first pressure chamber 910 is pressurized or depressurized. However, a structure in which the first pressure chamber 910 is maintained to an atmospheric pressure, and the second pressure chamber 920 is pressurized or depressurized may be employed. In addition, in order to prevent particles, etc., from entering, both first pressure chamber 910 and second pressure chamber 920 may be pressurized to a pressure equal to or larger than the atmospheric pressure so as to produce a pressure difference.

Next, an explanation will be given of a shaping device that forms a desired curved face based on the pre-curved face formed by the shaping device of the present disclosure. As illustrated in FIGS. 11 and 12, the shaping device is to precisely form a desired curved face in the pre-curved face of the film 20 having the micropattern 20a, and mainly includes a pressurizing unit 3 including a pressure chamber 30 that pressurizes the film 20 from the micropattern 20a side by the fluid, pressurizing means 35 for adjusting the pressure of the fluid in the pressure chamber 30, and a pressure receiving stage 32 which includes a pressure receiving face 321 formed in a predetermined curved face, and which supports the film 20. In addition, a temperature adjusting unit (unillustrated) that adjusts the temperature of the film 20 may be added depending on the material of the film 20.

The pressurizing unit 3 includes the pressure chamber 30 that directly pressurizes the film 20 by the fluid, and the pressurizing means 35 that adjusts the pressure of the fluid in the pressure chamber 30. In addition, the pressure chamber 30 can be formed by, for example, the film 20, a pressure-chamber casing 33, and sealing means 34 for air-tightly sealing the space between the film 20 and the pressure-chamber casing 33.

The pressure-chamber casing 33 is formed in a cylindrical shape with an opening and with a bottom, and forms the pressure chamber 30 that is an air-tightly sealed space when the opening is closed by the film 20. This opening is formed to be larger than the curved face formed in the film 20. The material is not limited to any particular one as long as it has pressure resistance and heat resistance relative to the shaping condition, and for example, a metal like stainless-steel is applicable. The film 20 closes the opening with the micropattern 20a facing the pressure chamber 30.

The sealing means 34 causes the pressure-chamber casing 33 to be intimately contact with the film 20 so as to air-tightly seal the pressure chamber 30. For example, as illustrated in FIG. 11, an O-ring is prepared as the sealing means 34, and a concaved groove 33b shallower than the diameter of the cross-section of the O-ring is formed in the end face of a side wall 33a of the pressure-chamber casing 33 at the pressure-receiving-stage-32 side, and the O-ring is disposed in this groove. Accordingly, the film 20 is held by the pressure-chamber casing 33 and the pressure receiving stage 32, and thus the pressure-chamber casing 33 can intimately contact the film 20. Hence, the interior of the pressure chamber 30 can be air-tightly sealed. In addition, even if a slope is present between the pressure-chamber casing 33 and the film 20, if the parallelism is within the crush rate of the O-ring, the pressure chamber 30 can be surely sealed.

Opening/closing means is applied to open/close the pressure chamber 30. It is not illustrated in the figure but the opening/closing means moves the pressure-chamber casing 33 and the pressure receiving stage 32 relative to each other so as to adjust the distance therebetween. For example, the pressure-chamber casing 33 may be moved close to or apart from the pressure receiving stage 32 by an electric motor and a ball screw. Needless to say, any structure is applicable as long as it can move the pressure-chamber casing 33 close to or apart from the pressure receiving stage 32, and the pressure-chamber casing can be moved by a hydraulic or pneumatic cylinder.

The pressurizing means 35 is not limited to any particular one as long as it can adjust the pressure of the fluid in the pressure chamber 30 up to pressure that can transfer the curved face of the pressure receiving stage 32 to the film 20. For example, as illustrated in FIG. 1, the pressure-chamber casing 33 is connected with a pressure-chamber gas charge/discharge flow channel 351, and gas, such as air or an inert gas, is charged to or discharged from the pressure chamber 30 through the pressure-chamber gas charge/discharge flow channel 351. To supply the gas, a gas supply source 352 like a tank or a compressor having compressed gas is applicable. In addition, to discharge the gas, it is not illustrated in the figure but the gas can be discharged by opening/closing a degassing valve. Note that a safety valve may be added as needed.

The pressure receiving stage 32 supports the film 20 to which the pressure of the pressurizing unit 3 is applied, and forms the pre-curved face of the film 20 in a predetermined curved face. The curved face is formed on the pressure receiving face 321 of the pressure receiving stage that is a surface at a side contacting the film 20. The curved face corresponds to, for example, a curved face of a concave lens or a convex lens. The pressure receiving face 321 is preferably formed in a mirror-finished surface having at least a surface roughness that does not damage the function of the micropattern 20a and that of the curved face. The material is not limited to any particular one as long as it has pressure resistance and thermal resistance relative to the shaping condition, and for example, a ferrous material like carbon steel or a metal like SUS. When the film 20 is heated from the pressure-receiving-stage-32 side, a metal, etc., having high thermal conductivity is preferable. In addition, when the film 20 is heated from the pressure-chamber-30 side, a material with low thermal conductivity may be applied so as to prevent the heat from being transmitted to the pressure-receiving-stage-32 side, but in order to suppress an uneven heating, it is preferable that the stage surface should be formed of a material having high thermal conductivity.

The temperature adjusting unit is not illustrated in the figure, but is to adjust the temperature of the film 20 by heating or cooling the film 20. The temperature adjusting unit includes heating means or cooling means for directly or indirectly heating or cooling the film 20.

The heating means is not limited to any particular one as long as it can heat the film 20 to a temperature that can deform the film to a curved face when the film is depressed against the pressure receiving stage 32, e.g., in the case of a resin film, a temperature equal to or higher than the glass transition temperature of the resin or the melting temperature thereof. In addition, the heating means can employ a structure that heats the film 20 from the pressure-receiving-stage-32 side or from the pressure-chamber-30 side. More specifically, a heater may be provided in the pressure receiving stage 32 or in a stage main body 320 on which the pressure receiving stage 32 is mounted so as to heat the film 20 from the pressure-receiving-stage-32 side. In addition, a radiant heat source that heats the film 20 by emission of electromagnetic wave like a ceramic heater or a halogen heater may be provided in the pressure chamber 30. Still further, the gas to be supplied to the pressure chamber 30 may be heated, and the film may be heated by the heated gas. When, for example, the film 20 is formed of a metal, the heating means can be omitted.

The cooling means is not limited to any particular one as long as it can cool the film 20 to a predetermined temperature, e.g., in the case of the resin film, a temperature lower than the glass transition temperature of the resin or the melting temperature. The cooling means can employ a structure that cools the film 20 from the pressure-receiving-stage-32 side or from the pressure-chamber-30 side. More specifically, a water channel for cooling may be provided in the pressure receiving stage 32 or the stage main body 320 to cool the film 20 from the pressure-receiving-stage-32 side. In addition, a cooling gas or liquid may be circulated in the pressure chamber 30 to cool the film.

Alternatively, the temperature adjusting unit may be a multiple combination of the aforementioned heating means and cooling means.

The shaping device of the present disclosure may include a depressurizing unit 4 having a depressurizing chamber that depressurizes the atmosphere between the film 20 and the pressure receiving stage 32. According to this structure, the gas present between the film 20 and the pressure receiving stage 32 can be eliminated, and thus it becomes possible to uniformly depress the film 20 against the pressure receiving stage 32 for shaping.

Depressurizing unit 4 includes, as illustrated in FIG. 1, for example, a depressurizing chamber 40 that retains therein-side the film 20, and depressurizing means 45 for discharging the gas in the depressurizing chamber 40.

The depressurizing chamber 40 includes a depressurizing-chamber casing, depressurizing-chamber sealing means 44, and the pressure receiving stage 32 or the stage main body 320 on which the pressure receiving stage 32 is mounted.

The depressurizing-chamber casing includes, for example, the pressure-chamber casing 33, a flange 431 spreading horizontally above the upper part of the pressure-chamber casing 33, and bellows 432 extending downwardly from the flange 431 so as to cover the pressure-chamber casing 33. In this case, the pressure chamber 30 also serves as a part of the depressurizing chamber 40.

The depressurizing-chamber sealing means 44 causes the depressurizing-chamber casing 33 to intimately contact the pressure receiving stage 32 or the stage main body 320 so as to air-tightly seal the depressurizing chamber 40. For example, as illustrated in FIG. 1, an O-ring as the depressurizing-chamber sealing means 44 is prepared, a concave recess 432b shallower than the diameter of the cross-section of the O-ring is formed in the end portion of the bellows 432 at the stage-main-body side, and the O-ring is disposed in this groove 432b. Hence, the depressurizing chamber 40 can be air-tightly sealed. In addition, even if there is a slope between the depressurizing-chamber casing and the pressure receiving stage 32, when the parallelism is within the crush rate of the O-ring, the depressurizing-chamber 40 can be surely sealed.

It is needless to say that the depressurizing-chamber casing and the depressurizing-chamber sealing means 44 should have a rigidity to withstand external pressure when depressurized.

The depressurizing means 45 can be formed by a depressurizing-chamber gas charge/discharge flow channel 451 connected to the depressurizing chamber 40, and a depressurizing pump 452 that discharges the gas in the depressurizing chamber 40 through the depressurizing-chamber gas charge/discharge flow channel 451.

It is appropriate if the depressurizing pump 452 can depressurize the depressurizing chamber 40 up to a pressure range that does not cause a transfer error when the film 20 is depressed against the pressure receiving stage 32.

In addition, separating means 46 which separates the film 20 from the pressure receiving stage 32 at the time of depressurizing so as to facilitate degassing between the film 20 and the pressure receiving stage 32 may be provided in the depressurizing chamber 40. According to this structure, the gas can be surely eliminated, thereby suppressing a transfer error. The separating means 46 is not limited to any particular one as long as it can form a gap between the film 20 and the pressure receiving stage 32, but for example, as illustrated in FIG. 1, includes a pinch 461 that holds an end of the film 20, and ascending/descending means (unillustrated) for moving the pinch 461 in the direction in which the film 20 and the pressure receiving stage 32 are separated from each other.

The pinch 461 can be, for example, a clip holding the film by application of elastic force like a spring.

The ascending/descending means may be one that moves the pinch by a hydraulic or pneumatic cylinder, or may be one that moves the pinch by an electric motor and a ball screw.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

REFERENCE SIGNS LIST

20 Film
20a Micropattern
32 Pressure receiving stage
91 First casing
92 Second casing
93 Pressure adjusting means
94 Fixing means
95 Heating means
910 First pressure chamber
920 Second pressure chamber

The invention claimed is:

1. A shaping method for forming, in a predetermined shaping-target area of a film a patterned face including a micropattern that has the minimum dimension of the width of the concavity and convexity in the planar direction formed equal to or smaller than 2 μm, and a rear face opposite to the patterned face, a curved face beyond a thickness of the film, the method comprising:
   a fixing step for fixing an outer edge of the shaping-target area of the film;
   a first heating step for heating the film, wherein during the first heating step, a heated heat-transfer stage is caused to contact the rear face of the film to heat the film, and then the heat-transferred stage is retracted to a location which does not affect shaping at the time of shaping; and
   a pressure adjusting step for adjusting a pressure of fluid at a patterned face side and a pressure of fluid at a rear face side, and applying the pressure difference as a shaping pressure to the shaping-target area of the film to form a curved face.

2. The shaping method according to claim 1, wherein in the pressure adjusting step, either one of the patterned face of the film and the rear face thereof is maintained to an atmospheric pressure.

3. The shaping method according to claim 1, wherein in the pressure adjusting step, the patterned-face side is pressurized.

4. The shaping method according to claim 1, wherein in the pressure adjusting step, the patterned-face side is depressurized.

5. The shaping method according to claim 1, further comprising:
   a disposing step for disposing the film on a pressure receiving stage including a pressure receiving face that is a desired curved face in such a way that a rear face of a pre-curved face formed through the pressure adjusting step overlaps the pressure receiving face; and
   a pressurizing step for pressurizing the film against the pressure receiving stage from the patterned-face side by a fluid.

6. The shaping method according to claim 5, further comprising a second heating step for heating the film.

7. The shaping method according to claim 5, further comprising, prior to the pressurizing step, a depressurizing step for depressurizing an atmosphere between the film and the pressure receiving stage.

8. The shaping method according to claim 2, further comprising:
   a disposing step for disposing the film on a pressure receiving stage including a pressure receiving face that is a desired curved face in such a way that a rear face of a pre-curved face formed through the pressure adjusting step overlaps the pressure receiving face; and
   a pressurizing step for pressurizing the film against the pressure receiving stage from the patterned-face side by a fluid.

9. The shaping method according to claim 3, further comprising:

a disposing step for disposing the film on a pressure receiving stage including a pressure receiving face that is a desired curved face in such a way that a rear face of a pre-curved face formed through the pressure adjusting step overlaps the pressure receiving face; and a pressurizing step for pressurizing the film against the pressure receiving stage from the patterned-face side by a fluid.

10. The shaping method according to claim 4, further comprising:
   a disposing step for disposing the film on a pressure receiving stage including a pressure receiving face that is a desired curved face in such a way that a rear face of a pre-curved face formed through the pressure adjusting step overlaps the pressure receiving face; and
   a pressurizing step for pressurizing the film against the pressure receiving stage from the patterned-face side by a fluid.

11. A shaping device that forms, in a predetermined shaping-target area of a film comprising a patterned face including a micropattern that has the minimum dimension of the width of the concavity and convexity in the planar direction formed equal to or smaller than 2 µm, and a rear face opposite to the patterned face, a curved face beyond a thickness of the film, the device comprising:
   a first casing that forms a first pressure chamber at the patterned-face side of the film;
   a second casing that forms a second pressure chamber at the rear-face side of the film;
   fixing means for fixing an outer edge of the shaping-target area of the film;
   pressure adjusting means for adjusting a pressure of fluid in the first pressure chamber and a pressure of fluid in the second pressure chamber, and applying the pressure difference as a shaping pressure to the shaping target-area of the film to form a curved side face;
   heating means for heating the film, wherein the heating means comprises a heat-transfer stage which is formed so as to be separable from the rear face of the film, and which uniformly heats a contacting portion with the film; and
   moving means for moving the heat-transfer stage to move towards and away from the film.

12. The shaping device according to claim 11, wherein the pressure adjusting means maintains the first pressure chamber or the second pressure chamber to an atmospheric pressure.

13. The shaping device according to claim 11, wherein the pressure adjusting means comprises pressurizing means for pressurizing the first pressure chamber or the second pressure chamber.

14. The shaping device according to claim 11, wherein the pressure adjusting means comprises depressurizing means for depressurizing the first pressure chamber or the second pressure chamber.

15. The shaping device according to claim 11, wherein the fixing means is formed integrally with the first casing or the second casing.

16. The shaping device according to claim 12, wherein the fixing means is formed integrally with the first casing or the second casing.

17. The shaping device according to claim 13, wherein the fixing means is formed integrally with the first casing or the second casing.

18. The shaping device according to claim 14, wherein the fixing means is formed integrally with the first casing or the second casing.

* * * * *